Figures 1, 2:
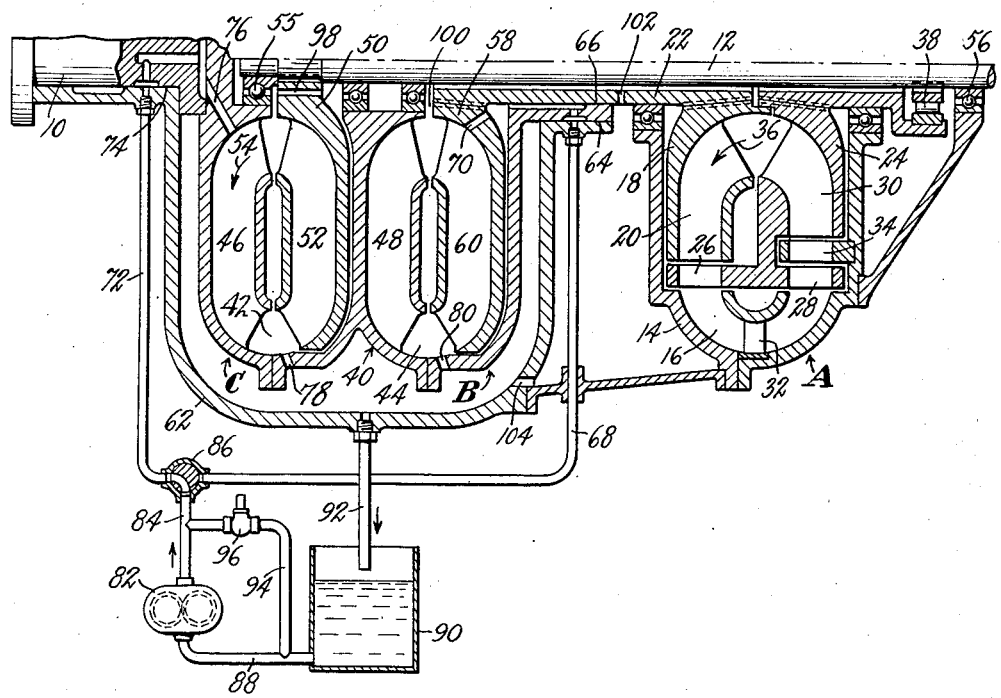

March 26, 1940.  A. LYSHOLM  2,194,949

POWER TRANSMISSION

Filed Dec. 11, 1937

INVENTOR.
Alf Lysholm
BY
his ATTORNEY.

Patented Mar. 26, 1940

2,194,949

UNITED STATES PATENT OFFICE 2,194,949

POWER TRANSMISSION

Alf Lysholm, Stockholm, Sweden, assignor to Aktiebolaget Ljungströms Ångturbin, Stockholm, Sweden, a corporation of Sweden Application December 11, 1937, Serial No. 179,237
In Germany December 16, 1936

6 Claims. (Cl. 60—54)

The present invention relates to power transmission apparatus and has particular reference to such apparatus for transmitting traction power for driving a vehicle.

Still more particularly the invention relates to power transmission apparatus employing alternative low speed and high speed drives of which the low speed drive is through a hydraulic torque converter.

The invention is particularly applicable for the transmission of driving power of considerable magnitude for the driving of railway vehicles and the like and a principal object of the invention is to provide transmission apparatus in which in any of the alternative drives available, elastic power transmission will be obtained between the source of power and the element or elements driven thereby.

A further object of the invention is the provision of transmission apparatus of the character described which will avoid the necessity of making a mechanical power connection as by friction clutch or the like, between different elements while they are under substantial load, so as to avoid wear and heating of the apparatus occasioned by such connection.

Other and more detailed objects of the invention together with the advantages to be derived from its use, will be apparent from consideration of the ensuing portion of this specification and of the accompanying drawing forming a part hereof, in which there is described by way of example suitable embodiments of apparatus for carrying the invention into effect.

In the drawing:

Fig. 1 is a diagrammatic longitudinal central half section of apparatus embodying the invention; and Fig. 2 is a similar view of another form of apparatus embodying the invention.

Referring now more particularly to Fig. 1, the apparatus shown therein comprises a hydraulic torque converter indicated generally at A and two hydraulic couplings indicated respectively at B and C.

As shown, power is delivered to the apparatus from a driving shaft 10 which may, for example, be the crank shaft or other main shaft of a prime mover and power is delivered by the transmission apparatus through the driven shaft 12 to the element or elements requiring power, such for example as the driving axle or axles of a vehicle.

Referring to the torque converter A, which is of known construction and which may advantageously be made in accordance with the disclosure contained in U. S. Patent No. 1,900,118, granted to me March 7, 1933, there is provided a stationary casing 14 forming a working chamber 16 for circulation of working fluid in a closed path of flow. In this chamber is located an impeller or pump rotor 18 provided with a ring of pump blades 20 and having hollow shaft part 22 rotatably mounted in the casing. Shaft part 22 extends through the casing for connection to a driving element as will be hereinafter described.

Also within the working chamber 16 there is provided a turbine rotor 24 carrying, in the embodiment illustrated, three rings or stages of turbine blades 26, 28, and 30. Between the turbine stages 26 and 28 is interposed the ring of fixed guide or reaction blades 32 and between turbine stages 28 and 30 is a second stage of fixed guide blades 34.

It will be understood that within the scope of the present invention the number of turbine stages provided by the turbine wheel and other constructional features of the converter may be varied.

In this type of converter, circulation of the working fluid in the closed path of flow and in the direction indicated by the arrow 36 is effected by rotation of the pump member 18, and the working fluid delivers power to the turbine member by virtue of its flow through the several stages of turbine blading. Further, in this type of apparatus, the working chamber 16 is constantly filled with working fluid which is advantageously maintained under positive pressure during the periods when the converter is working. Such positive pressure may advantageously be supplied by the employment of apparatus of the kind shown in U. S. Patent No. 1,934,936 granted to me November 13, 1933.

Power transmitted to the turbine member 24 through the medium of the working liquid in the converter is in turn transmitted to the driven shaft 12, preferably through the medium of an automatically releasable coupling such as the overrunning clutch indicated at 38.

Referring now to the hydraulic couplings B and C, this apparatus, in the form of construction illustrated, comprises a rotatably mounted casing structure indicated generally at 40 secured to and rotating with the driving shaft 10. This casing structure provides two separate working chambers 42 and 44 for working liquid. Fixed to the casing in chamber 42, and advantageously cast integrally with a part of the casing structure is a ring of pump blades 46 and a like ring of pump blades 48 is provided in the second working chamber 44.

A driven or impelled member 50, which may conveniently be termed a secondary clutch member, is located in chamber 42 and is provided with a ring of blades 52 to which power is transmitted by the working liquid, circulated in the direction of the arrow 54 by rotation of the pump blades 48. Member 52 is fixedly secured to the driven shaft 12, which in the present instance is rotatably mounted at its forward end in bearing 55, piloted in the casing structure 40 and which at its rearward end is carried by bearing 56 in the stationary housing structure 14 of the converter.

A driven or secondary member 58 having blades 60 is located in the working chamber 44 of the coupling B, this member being connected to the hollow shaft part 22 and serving to drive the pump member 18 of the converter.

The rotating housing structure 40 of the couplings B and C is encased in a stationary housing 62. A bearing 64 is provided between this stationary housing and the rotating casing 40, and a second bearing 66 is provided between the casing 40 and the hollow shaft 22 providing the connection between members 58 and 18.

For supplying working liquid to chamber 44 of coupling B, pipe 68 is connected to the stationary casing 62 which, with the bearings 64 and 66, is provided with suitable passages for flow of liquid from pipe 68 to the interior of the rotating casing 40. Liquid admitted to the interior of this casing may flow between the casing and member 58 into chamber 44 but there is preferably provided a series of openings or ports 70, near the axis of rotation, for flow of working fluid into the working space between the blades.

For supplying liquid to the working chamber 42, a pipe 72 is provided which is fixed to the stationary casing 62. The bearing 74 of the latter is provided with suitable passages providing communication between pipe 72 and one or more passages or ports 76 for delivering working liquid to the interior of chamber 42.

Casing structure 40 is provided with a series of small drain holes or ports 78 near the outer periphery of the chamber 42 and a similar set of drain ports 80 near the outer periphery of chamber 44.

For supplying working liquid to the chambers of the couplings a pump 82 is provided, the delivery pipe 84 of which is connected to the pipes 68 and 72 by means of a three way control valve or cock 86.

Pump 82 draws liquid through pipe 88 from a suitable sump 90 to which liquid is returned from the coupling apparatus by means of the drain pipe 92.

In the apparatus illustrated, pump 82 is shown as a positive displacement gear pump and in the event this type of pump is employed, the delivery pipe 84 leading therefrom is advantageously provided with a by-pass or return pipe 94 leading back to the suction or to the sump, such by-pass pipe being governed by a loaded by-pass valve 96.

The above apparatus functions as follows, it being assumed that the apparatus is installed as the transmission mechanism for a vehicle drive and it further being assumed that the working chamber of the converter A is filled with working liquid while the chambers of the couplings B and C are empty.

Upon starting of the prime mover to which the driving shaft 10 is connected, the driven shaft 12 being assumed to be stationary through its connection to the driving wheels of a stationary vehicle, the primary or pump members of both couplings B and C rotate idly owing to the absence of working fluid in the working chambers of the couplings. It further being assumed that pump 82 is operating to provide liquid under pressure in pipe 84, the three way valve 86 is turned so as to deliver working fluid to the chamber 44 of coupling B. As this chamber is filled by working liquid, power is transmitted by the liquid to the secondary member 58 of the coupling which in turn rotates the pump member 18 of the converter. In the converter the power transmitted to the pump member is in turn transmitted with increased torque to the turbine member 24. This increased torque is in turn delivered through the clutch 38 to the driven shaft 12.

Under this condition of drive, the driven shaft 12 provides greater torque than the driving shaft 10 and rotates at substantially lower speed than shaft 10. If it is assumed that the working chamber of the coupling B is entirely filled with liquid and the secondary member thereof has come up to its full speed, the speed of this member and of the pump member of the converter will be only slightly less than that of the driving shaft 10 and the coupling pump blades 48. The difference in speed between these elements represents the normal full load hydraulic slip of the coupling. The speed reduction between shafts 10 and 12 is substantially entirely provided by the converter, the characteristic operation of which is such that within the range of practically desirable efficiencies the maximum speed of the turbine member is of the order of, roughly, 70% of the speed of the pump member of the converter.

It will thus be seen that with the apparatus functioning as above described, there is provided a low speed torque multiplying drive suitable for accelerating vehicles from a standstill or for propelling them up heavy grades where a high value of tractive effort is required at the driving wheels.

If now, with the apparatus operating as above described, it is desired to change to a higher speed of drive in which the high torque of the low speed drive is not required, this is accomplished by merely shifting the three way valve 86 so as to close the connection betwen pipes 84 and 68 and open the connection between pipe 84 and pipe 72.

As soon as this change in the connection is made, the chamber 42 of coupling C commences to fill to provide liquid driving connection between shafts 10 and 12. At the same time, cessation of the supply of liquid to coupling B permits the working chamber of this coupling to be emptied by the flow of liquid through the drain ports 80. Emptying of coupling B breaks the driving connection to the converter and upon filling of the chamber 42 in coupling C, a hydraulic driving connection is established directly between the driving and the driven shafts.

Under this condition of drive, shaft 12 operates at substantially the speed of the driving shaft 10, the only speed differential being the few percent represented by the hydraulic slip in the coupling C.

Also, under this condition of drive, the moving parts of the torque converter A come to rest so as to eliminate any drag due to operation of the converter. It will be evident that with the working chamber of coupling B emptied, the member consisting of the secondary member 58 of this coupling and the pump member 18 of the converter may come to rest and because of the over-running clutch connection 38 between the turbine member 24 and the shaft 12, the turbine member of the converter may also come to rest.

With the apparatus operating in the manner last described, it will be evident that a substantially direct drive connection is attained between prime mover and the driven elements, such connection however being resilient in nature due to the interposition of the hydraulic coupling C in the drive line.

The arrangement hereinabove described presents numerous advantages over hydraulic drive apparatus previously proposed in which hydraulic torque converters and hydraulic couplings have been employed in combination to effect different types of drive.

In the present instance, the converter A is filled with working liquid at all times. This presents substantial advantages for the following reasons: In hydraulic apparatus of this kind it is essential from the standpoint of securing operating efficiency and also from the standpoint of avoiding corrosion and erosion of the working parts that aeration of the working liquid be avoided. When the converter is maintained constantly filled with working liquid, aeration thereof is very readily avoided. On the other hand, if it is necessary to fill or empty the converter, aeration is practically impossible to avoid due to the fact that the working chamber of the converter contains rotating parts such as the pump and turbine stages and stationary parts such as the fixed or reaction stages. It will be evident that any attempt to fill the converter with the pump and/or the turbine parts rotating will have much the same effect as an attempt to fill a churn, with resulting aeration or even emulsification of the working fluid. Such emulsification is not only undesirable for the reasons previously pointed out, but also because of the fact that until such aeration or emulsification is cleared and a solid body of working liquid provided, the power transmitting capacity and efficiency of the converter is seriously impaired. For the reasons noted, it is practically impossible to secure proper transmission of power rapidly from a converter which must be filled from an empty condition. In the present construction, the loss of time incident to getting power from a converter which must be filled from empty condition is entirely avoided as well as the other disadvantages mentioned.

In the present construction, filling and emptying of the hydraulic couplings is required but the filling and emptying of such couplings does not present the same problem or disadvantages as the filling and emptying of a converter. The reason for this is that in such coupling structure as that illustrated, all parts are rotatably mounted, there being no fixed elements corresponding to the reaction blades with converter to provide a churning action when the coupling chamber is filled. Such being the case, liquid introduced into the coupling chamber will tend to form with comparative rapidity a solid mass for transmitting power from the primary into the secondary member of the coupling.

In order to avoid trapping of air at the centers of the couplings B and C when they are filled, central vent passages 98 and 100 are advantageously provided. If excess liquid should flow through these vent passages it may be returned to the sump by any suitable drain ports as for instance ports 102 and 104.

In the construction shown, the coupling chambers 42 and 44 are provided with drainage ports which continue to drain liquid from the working chambers at all times when there is liquid therein. Pump 82, of course, supplies to whichever coupling is operating a sufficient make-up supply of working liquid to maintain the desired quantity of liquid in the chamber of the coupling.

In the transmission apparatus of this character, it is also desirable to provide hydraulic power connection for the direct connection between the driving and driven shafts, as is provided in the apparatus just described by the coupling C. The reason for this is that when shifting from low speed drive to high speed drive, there is a substantial speed differential between shafts 10 and 12, the latter turning materially slower than the former, as previously explained. This speed differential must be taken up in arriving at the direct drive connection with substantially synchronized speed between these two shafts. If this is done by means of the usual mechanical connection such as a friction clutch, the clutch itself must effect this increase of speed of shaft 12 with respect to the speed of shaft 10, either by acceleration of the vehicle to the driving wheels of which shaft 12 is connected, or by deceleration of the prime mover the speed of which is represented by the speed of shaft 10. In other words, any mechanical coupling in the position of the coupling C must engage in a manner necessitating slipping of the clutch elements before positive connection is arrived at. This inevitably leads to wear, and since such slip is a direct loss, it is reflected in heating of the mechanical elements. These factors of heating and wear definitely limit the practical maximum size for friction and like mechanical couplings in this position. By employing a hydraulic coupling at this place in the mechanism, wear is avoided and much greater power can safely be transmitted than can reliably be transmitted by means of a friction clutch.

On the other hand, it will be noted that the coupling B is not required to engage under any substantial load. The reason for this is that the power required to accelerate the pump wheel 18 of the converter from a standing start to a speed equal to the idling speed of a prime mover of the internal combustion type, is relatively slight, and owing to the inherent characteristics of the torque converter A the pump wheel may be rotated at the slow or idling speed of an engine without transmitting sufficient power to overcome the inertia of the vehicle. Consequently, at low engine speeds, the coupling B may be filled and substantially synchronous driving connection established between shaft 10 and member 22 without transmission of any substantial amount of power through the coupling.

Because of this, it may in certain instances be not only feasible, but desirable, to employ instead of the hydraulic coupling B, a mechanical coupling of the friction type, since under the conditions described, such coupling may be fully engaged while under substantially no load, and no load thereafter transmitted through the coupling under fully engaged conditions when no wear due to slippage will occur.

Apparatus illustrative of this embodiment is shown in Fig. 2.

In this embodiment, the arrangement of driving shaft 10 and driven shaft 12 is the same as in the embodiment previously described, as is also the arrangement and disposition of the parts constituting the hydraulic torque converter A, which parts bear the same reference characters as the corresponding parts in Fig. 1. Further, the hydraulic coupling C is also constructed and arranged in the same manner as in Fig. 1, this clutch being filled through pipe 72 and emptied through ports 78 in the manner described in connection with the operation of the device shown in Fig. 1, and further advantageously being provided with air vents similar to those indicated in Fig. 1 to prevent trapping of air at the center of the coupling.

In the present instance, however, instead of the hydraulic coupling B there is provided a friction clutch indicated generally at B'. In the drawing this clutch has been indicated diagrammatically as a multiple disc clutch having a series of driving plates 106 axially displaceable but rotatably fixed with respect to a driving cylinder 108 attached to and rotating with the housing member 40 of coupling C. The driven plates 110 of the clutch are rotationally fixed but axially slidable in a suitable spline or keyway 112 cut in the hollow shaft part 22' connected to the pump member 18 of the torque converter A.

Clutch B' is shifted into and out of engagement by means of a sliding collar 114 mounted on shaft 22' and connected through a ball bearing 116 to a shift ring 118 which is in turn actuated by means of a forked control lever 120 pivotally mounted at 122 in the main casing structure.

It will be understood that the above described friction clutch structure is given merely by way of example and that any other suitable and equivalent form of mechanical clutch may be employed instead of the kind described.

The operation of the above described embodiment of the invention will be largely obvious from the description of the operation of the form of apparatus shown in Fig. 1.

In order to obtain low speed torque multiplying drive, the coupling C is emptied or permitted to remain empty and clutch B' is engaged to transmit power to the pump member of the torque converter A. As previously pointed out, the engagement of clutch B' to transmit power to the torque converter may be effected under no load conditions or conditions of such light load that a friction clutch can be engaged with substantially no slip and with consequently imperceptible heating or wear.

In order to shift into high speed drive, clutch B' is disengaged and the coupling C filled with liquid by suitable manipulation of the valve controlling the supply of liquid to the feed pipe 72, and as the coupling fills with liquid, power is transmitted directly through the coupling from the driving shaft to the driven shaft to afford substantially synchronous drive between these shafts.

In both of the embodiments illustrated, the preferred arrangement employing an overrunning clutch between the turbine member of the converter A and the driven shaft is shown, a non releasable connection may be used, in which event it is desirable to provide turbine blades which can in known manner be withdrawn from the liquid circuit in the converter when drive is transmitted through coupling C, to thereby reduce eddy losses in the converter which would occur with the turbine member continuing to rotate under such condition of drive.

While for purpose of illustration and description of the invention, I have shown certain specific embodiments of the invention, it will be understood that the scope of the invention is not limited to such embodiments but may include other forms of apparatus falling within the scope of the appended claims.

What I claim is:

1. A power transmission providing at least two alternative drives from a driving shaft to a driven shaft, one of said drives including a torque converter having a pump member and a hydraulic coupling for transmitting power from the driving shaft to said pump member, the other of said drives including a hydraulic coupling for transmitting power from the driving shaft to the driven shaft and constituting the only hydraulic connection in said other of said drives between said shafts, and means for alternatively emptying and filling said couplings at will to establish power transmission through one or the other of said drives.

2. A power transmission providing at least two alternative drives from a driving shaft to a driven shaft, one of said drives including a torque converter having a pump member and a turbine member and a hydraulic coupling for transmitting power from the driving shaft to said pump member, the other of said drives including a hydraulic coupling for transmitting power from the driving shaft to the driven shaft and constituting the only hydraulic connection in said other of said drives between said shafts, means for alternatively emptying and filling said couplings at will to establish power transmission through one or the other of said drives, and means for automatically disconnecting the turbine member of said converter from the driven shaft when the driven shaft tends to rotate at a speed higher than that of said turbine member, whereby to permit the turbine member to come to rest when drive is transmitted from the driving shaft to the driven shaft through the second mentioned hydraulic coupling.

3. In a power transmission including a drive having a hydraulic coupling as a power transmitting part of such drive, a rotatably mounted casing providing a chamber for working liquid, driving blades and driven blades in said chamber, a constantly open port in the casing adjacent to the outer periphery of the chamber for draining liquid therefrom, means for supplying liquid to the interior of said chamber, and means providing a passage for the escape of air from the radially inner part of the chamber as the chamber is filled with working liquid.

4. A power transmission providing at least two alternative drives from a driving shaft to a driven shaft comprising two hydraulic couplings each having pump elements constantly connected to the driving shaft and each having an impelled member, a hydraulic torque converter having a pump member and a turbine member, the impelled member of one of said couplings transmitting drive directly to the driven shaft, the impelled member of the other of said couplings being connected to the pump member of the torque converter, a releasable driving connection between the turbine member of the torque converter and the driven shaft, and means for filling and emptying said couplings in alternation.

5. A power transmission providing at least two alternative drives from a driving shaft to a driven shaft comprising a rotating casing connected to the driving shaft, said casing providing two hydraulic coupling working chambers and carrying pump blades in each chamber, an impelled member in each chamber, a hydraulic torque converter having a pump member and a turbine member, a driving connection between one of said impelled members and the driven shaft, a driving connection between the other of said members and the pump member of the converter, a releasable driving connection between the turbine member of the converter and the driven shaft, and means for filling and emptying said working chambers in alternation.

6. In a power transmission, casing structure providing a chamber for circulation of working liquid, driving blades and driven blades in said chamber, means for filling and emptying said chamber and means providing a passage for the escape of air from said chamber when working liquid is supplied thereto, said passage communicating with said chamber at the radially inner part thereof.

ALF LYSHOLM.